(12) United States Patent
Bellezza

(10) Patent No.: US 7,497,167 B2
(45) Date of Patent: Mar. 3, 2009

(54) INTEGRATED CONVEYOR SYSTEM FOR MOVING LOADS, IN PARTICULAR VEHICLES, ALONG A PRODUCTION LINE

(75) Inventor: Massimo Bellezza, Rivoli (IT)

(73) Assignee: CPM S.p.A., Turin (IT)

( * ) Notice: Subject to any disclaimer, the term of this patent is extended or adjusted under 35 U.S.C. 154(b) by 459 days.

(21) Appl. No.: 10/500,095

(22) PCT Filed: Dec. 23, 2002

(86) PCT No.: PCT/IT02/00821

§ 371 (c)(1),
(2), (4) Date: Nov. 30, 2004

(87) PCT Pub. No.: WO03/055774

PCT Pub. Date: Jul. 10, 2003

(65) Prior Publication Data

US 2006/0096835 A1    May 11, 2006

(30) Foreign Application Priority Data

Dec. 27, 2001   (IT)   ............... TO2001A1223

(51) Int. Cl.
*B61J 3/00* (2006.01)
*B65G 47/26* (2006.01)
(52) U.S. Cl. ................ 104/88.01; 198/419.1
(58) Field of Classification Search ......... 104/88.01, 104/89, 90, 96, 165, 162; 198/419.1, 431, 198/463.4, 795, 461.1
See application file for complete search history.

(56) References Cited

U.S. PATENT DOCUMENTS

| | | | | |
|---|---|---|---|---|
| 4,492,168 A | * | 1/1985 | Cellai | 105/30 |
| 4,492,297 A | | 1/1985 | Sticht | |
| 4,524,863 A | * | 6/1985 | Moge | 198/797 |
| 4,946,023 A | * | 8/1990 | Heinold et al. | 198/419.1 |
| 5,213,195 A | | 5/1993 | Sticht | |
| 5,577,593 A | | 11/1996 | Hooper | |
| 5,669,309 A | * | 9/1997 | Carlton et al. | 104/162 |
| 6,425,478 B1 | * | 7/2002 | Eberle | 198/795 |
| 6,705,454 B2 | * | 3/2004 | Fishaw et al. | 198/571 |

FOREIGN PATENT DOCUMENTS

| | | |
|---|---|---|
| DE | 200 12 052 U1 | 11/2000 |
| EP | 0 873 271 B1 | 10/2000 |
| WO | WO 99/33722 A1 | 7/1999 |

* cited by examiner

*Primary Examiner*—S. Joseph Morano
*Assistant Examiner*—Robert J McCarry, Jr.
(74) *Attorney, Agent, or Firm*—Leydig, Voit & Mayer, Ltd

(57) ABSTRACT

The integrated conveyor system has a number of independent powered modules (11), each having a pair of rails (2, 3), and powered belt (4) stretched in the transverse space defined between the pair of rails and forming a continuous support and guide structure and along which run a number of trucks are moved by the belt of each module along the rails. The conveyor system also includes a number of modules having no powered belt, a push module (116) having a powered belt and a brake module (11c) having a nonpowered belt; the trucks having stop means for forming, a train of mutually contacting trucks between the push module and the brake module, and pushed by the powered belt of the push module.

17 Claims, 3 Drawing Sheets

INTEGRATED CONVEYOR SYSTEM FOR MOVING LOADS, IN PARTICULAR VEHICLES, ALONG A PRODUCTION LINE

TECHNICAL FIELD

The present invention relates to an integrated conveyor system for moving loads, in particular vehicles, along an assembly line.

BACKGROUND ART

European Patent n. 0873271, filed by the present Applicant, and the pertinent parts of which are included herein purely by way of reference, describes a modular conveyor (known commercially as TTS) comprising a number of modules powered by independent motors, and each of which comprises a contoured structure (e.g. extruded, but which can also be formed using steel sections or other methods) defining a pair of rails, and a powered belt stretched inside the transverse space between the pair of rails, over or under the rails. The modules are arranged with the pairs of rails end to end to form a substantially continuous support and guide structure defining an endless path, and along which run a number of trucks, which engage the rails with respective rollers, and each of which has at least one pair of grip pads for engaging the belt of each module with the aid of push means. The trucks are thus moved selectively by the belt of each module along the rails in a predetermined direction; and transit from one module to the next is made possible by the distance between the pads of each truck being greater than the distance between the belts of two adjacent modules, so that, until the downstream pad of a truck traveling between two modules engages the downstream module, the upstream pad of the same truck still engages the belt of the module the truck is leaving, so that the truck is "pushed" onto the downstream module. Conversely, when the downstream pad engages the belt of the downstream module, the truck is "pulled" by the downstream module belt, thus enabling the upstream pad to leave the upstream module.

Conveyors of the above type have been enormously successful commercially, in that the modules can be floor-mounted or suspended from an overhead structure, and provide for moving the trucks horizontally as well as up and down inclines; curved portions can be formed using modules of appropriate length and shape; and the same trucks can be equipped with floor conveyor pallets, or with attachments, possibly movable vertically, for overhead loads.

For certain applications, however, and particularly for conveying loads along assembly lines, in which a number or "train" of trucks must move at strictly constant speed, with the trucks close together in strictly predetermined positions, the above conveyor is unsuitable, in that, to form a "train" of trucks with the above characteristics, the belt speed of the modules forming the production line would have to be controlled and maintained rigorously constant. Though theoretically possible, using special electric motors and sophisticated electronic controls, the cost involved would be so high as to make the system uncompetitive.

In some cases, therefore, the TTS conveyor is currently unsuitable, in terms of cost, for vehicle assembly lines involving a high degree of precision, and is mainly used for other types of transportation and/or as assembly line return lines.

Assembly lines are therefore equipped with conventional conveyors, in which a number of nonpowered trucks or platforms are accumulated to form a "train", which is moved along the assembly line by pushing the last upstream platform in the train (here and in the following description, "upstream" and "downstream" are used with reference to the traveling direction of the movable conveying members, be they trucks or platforms) by means of a push station defined by a number of powered rollers, which frictionally and laterally engage the longitudinal edges of the last upstream, i.e. tail, platform in the train; and the train of trucks/platforms is held together, with the trucks/platforms contacting one another, by a downstream braking station acting on the lead truck/platform in the train.

Though possible, the conveyor system resulting from integrating the above conveyor system and the TTS conveyor has several drawbacks, such as relatively high manufacturing cost, excessive rail size, and no standardization. Moreover, the number of trucks/platforms in the "train", and hence the length of the production line, are restricted by the horizontal force the push station is capable of producing.

DISCLOSURE OF INVENTION

It is an object of the present invention to provide a conveyor system designed to eliminate all the aforementioned drawbacks, and which, in particular, can be formed using only standard TTS conveyor modules.

According to the present invention, there is provided an integrated conveyor system comprising a number of trucks, and a number of independent modules, each comprising a pair of rails, and a powered belt stretched inside the transverse space defined between the pair of rails; the modules being arranged with the pairs of rails end to end to form a substantially continuous support and guide structure for said trucks, which run along said pairs of rails, and each have at least one pair of grip pads, which, with the aid of push means, selectively engage, and are moved along the rails in a predetermined direction by, the powered belts of said modules; the pads of each truck being located such a distance apart that, when a truck leaves a first module to engage a second module adjacent to the first, at least one pad of the truck still cooperates with the belt of at least one of said first and second modules; characterized by also comprising:

a number of modules having no powered belt, and aligned to define a work line; and a push module having a powered belt and located at a first end of the work line;

said trucks having stop means for forming, along said work line and downstream from the push module, a train of trucks contacting one another between said rails; the train of trucks being pushed along at a predetermined speed by the powered belt of the push module only.

The system also comprises a brake module having a non-powered idle belt, and located at a second end of the work line opposite the first end.

Both the production line and the return line are therefore formed using standard TTS modules, thus reducing the size and cost of the production line rails and the cost of the conveyor system as a whole, by using standard, mass produced components. Moreover, unlike a conventional TTS conveyor, no sophisticated, high-cost electronic control system is required to synchronize the speed of the motors of the TTS modules forming the production line.

Finally, by simply adjusting the vertical travel (to and from the belt) of the truck pads, the thrust imparted to each truck by the same module can be considerably increased, thus enabling the formation of push modules capable of moving extremely long "trains" of trucks, and therefore the formation of relatively long production lines.

BRIEF DESCRIPTION OF THE DRAWINGS

A preferred, non-limiting embodiment of the invention will be described by way of example with reference to the accompanying drawings, in which.

BEST MODE FOR CARRYING OUT THE INVENTION

Figure 1:
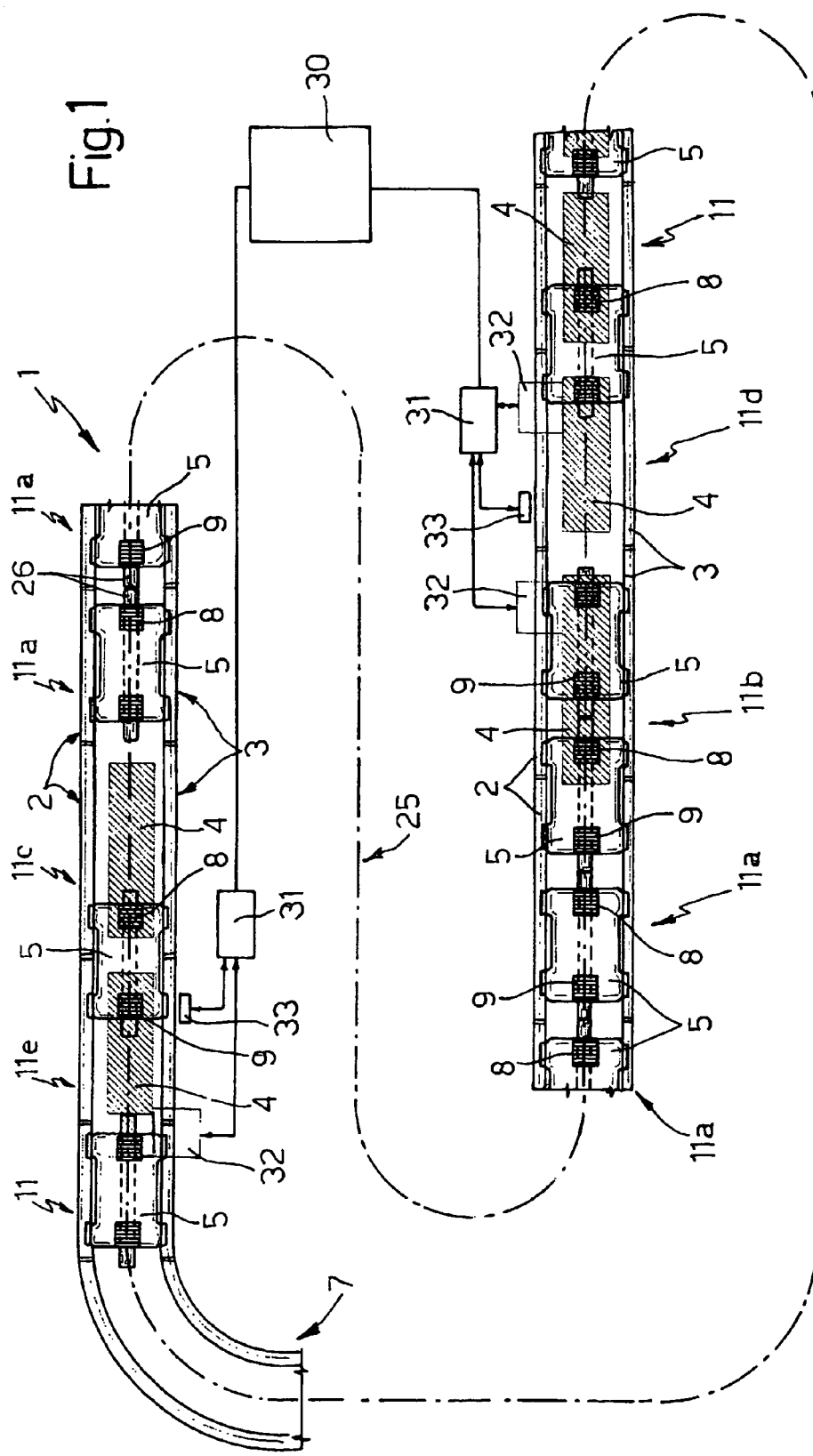
FIG. 1 shows a schematic top plan view of the conveyor system according to the invention.
Figure 3:
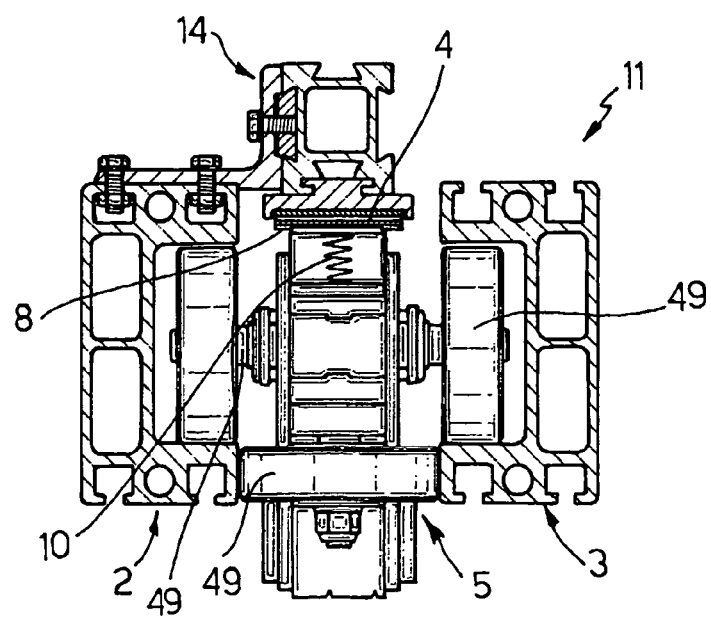
FIG. 3 shows a cross section, along line III-III, of a module of the conveyor system according to the invention.

With reference to FIGS. 1 and 3, number 1 indicates as a whole an integrated conveyor system comprising a number of independent modules 11, each comprising (FIG. 3) a pair of rails 2, 3, and a powered belt 4 stretched inside the transverse space defined between the pair of rails 2, 3. Modules 11 are arranged with the pairs of rails 2, 3 end to end to form a support and guide structure 7, which is substantially continuous (except for the small assembly gap between adjacent modules) and forms an endless path of any shape (FIG. 1) for a number of trucks 5 which run along pairs of rails 2, 3.

Each truck 5 comprises a number of wheels or rollers 49 idly engaging pairs of rails 2, 3 to guide the truck both transversely and vertically; and at least one pair of grip pads 8 and 9, which, with the aid of push means 10 (FIG. 3) defined, for example, by helical springs, selectively engage powered belts 4 of modules 11, and are moved by powered belts 4 of modules 11 in a predetermined direction depending on the traveling direction of belts 4. The powered belt 4 of each module 11 is supported over and connected integrally to rails 2, 3 by a supporting structure 14 (FIG. 3) made, like rails 2, 3, preferably, though not necessarily, from extruded metal sections, e.g. of light alloy.

Figure 4:
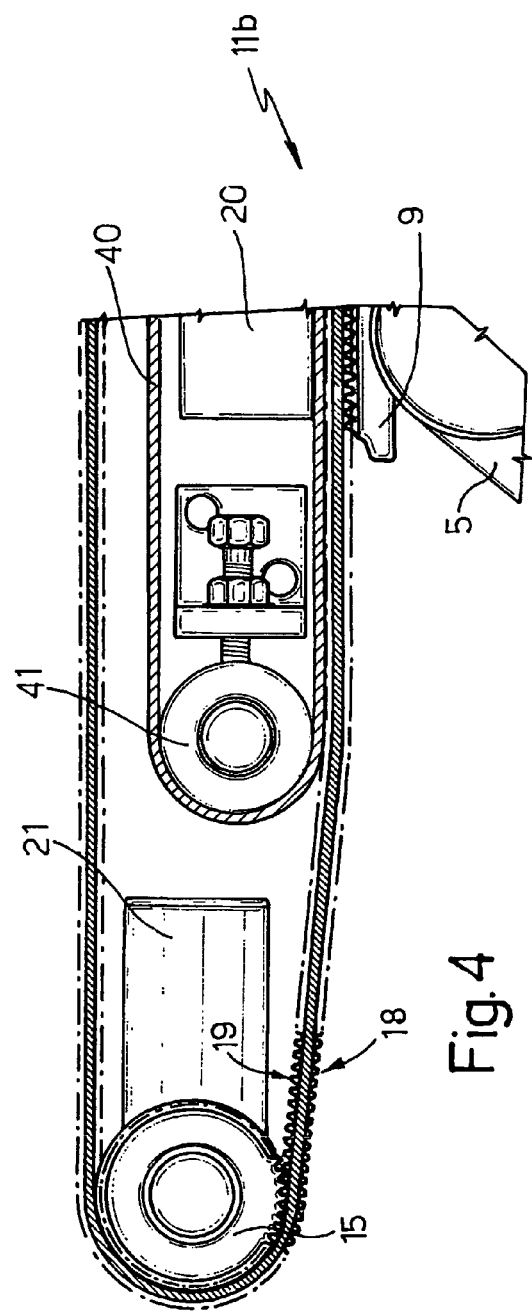
FIG. 4 shows a larger-scale elevation of a detail in FIG. 2, and FIG. 5 an even larger-scale elevation of a detail in FIG. 4.

More specifically, in known manner not shown in detail for the sake of simplicity, each structure 14 supports a belt 4 stretched, to form an endless loop comprising two straight branches, between a pair of rotary pulleys 15, 16 (FIGS. 2 and 4), which are thus carried integrally by respective module 11.

Figure 5:
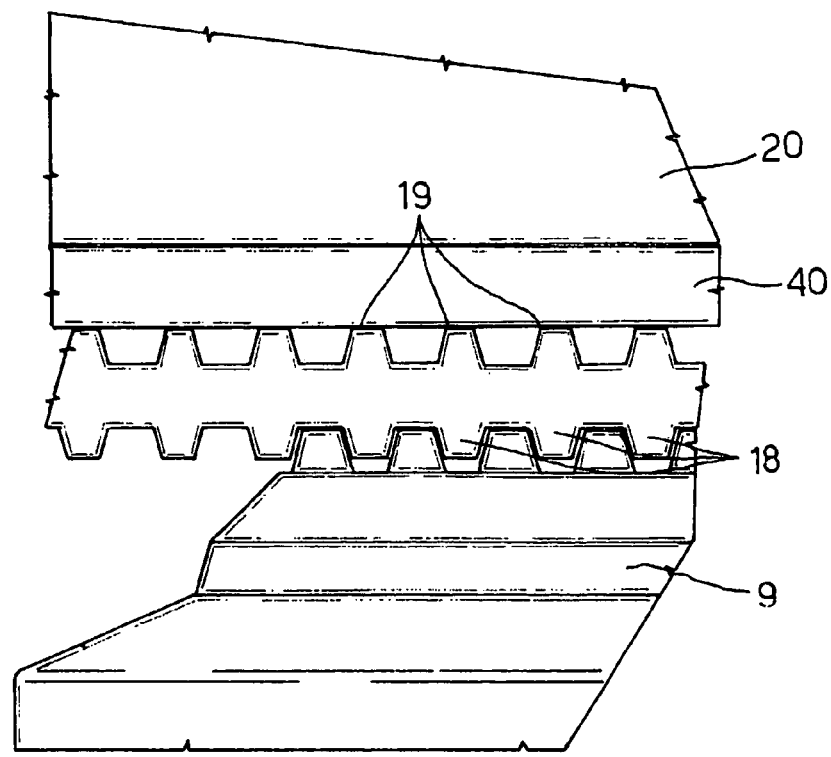

Belts 4 are preferably, though not necessarily, double-toothed belts (FIGS. 4 and 5), i.e. having a number of transverse teeth 18 formed on an outer face (facing trucks 5 in use) of the bottom branch (adjacent to trucks 5 in use) defined by belt 4, and a number of transverse teeth 19 formed on an inner face (facing away from trucks 5) of said bottom branch of belt 4. The invention obviously also extends to the use of flat belts having no teeth on one or both faces.

Pads 8, 9 of each truck 5 are preferably, though not necessarily, toothed pads for engaging the outer face of the bottom branch of each belt 4. Alternatively, the face of each pad 8, 9 facing the outer face of the bottom branch of each belt may be made of (covered with) high-friction-coefficient material. Whichever the case, pads 8, 9 are so spaced apart that, when a truck 5 leaves a first module 11 to engage a second module 11 adjacent to the first, at least one pad of truck 5 still cooperates with belt 4 of at least one of the adjacent modules 11. In the example shown, and as in EP0873271, the upstream pad 8 (in the traveling direction of trucks 5) continues to mesh with belt 4 of the upstream module 11 truck 5 is leaving, until the downstream pad 9 of the same truck 5 passes over the gap between the two adjacent modules 11 and engages belt 4 of the adjacent downstream module 11.

To counteract the meshing thrust exerted by pads 8, 9 on belts 4 and produced by springs 10, which are preloaded to a given value, a spacer 20 (FIGS. 4 and 5) made of antifriction (e.g. plastic) material is located between the respective inner faces of the two branches of each belt 4, and along which the inner face of the branch of belt 4 facing trucks 5 slides smoothly.

Belts 4 are powered by motors 21 (FIG. 4), e.g. for driving one of pulleys 15, 16, which, to mesh with the teeth (if any) of belts 4, are preferably, though not necessarily, also toothed. For example, even in the case of belts 4 toothed on both faces, the transmission (nonpowered) pulley may be smooth.

According to the invention, conveyor system 1 also comprises a number of modules 11a having no powered belts 4 or supporting structures 14 (therefore only comprising rails 2, 3), and aligned to define a work line 25 of desired length, of which FIG. 1 shows schematically the opposite ends and the intermediate portion indicated by a dot-and-dash line; and a push module 11b (FIGS. 1 and 2) having a belt 4 powered by a motor 21, and located at the upstream (start) end of work line 25.

Figure 2:
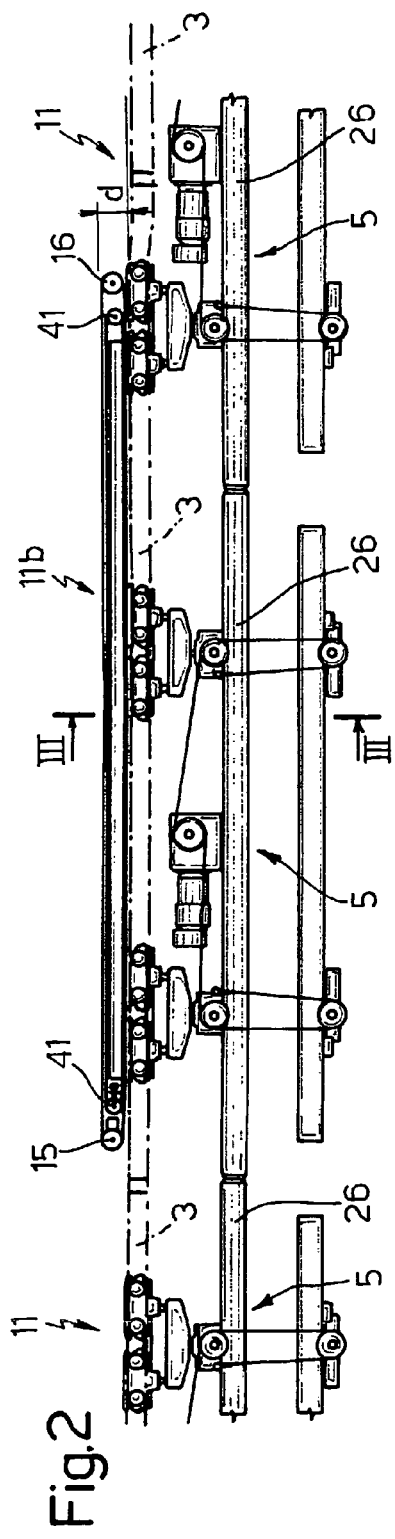
FIG. 2 shows a side view, with the rails shown schematically by dot-and-dash lines, of an upstream portion of a production line which can be formed using the conveyor system in FIG. 1.

Trucks 5 have stop means defined, for example, by the opposite ends of longitudinal bars 26 (FIG. 2), to form, along work line 25 and downstream from push module 11b, a train of carriages 5 contacting one another between rails 2, 3 (FIGS. 1 and 2). According to the invention, the train of carriages 5 is pushed along at a predetermined speed solely by the powered belt 4 of push module 11b, as described in detail later on.

Conveyor system 1 according to the invention also comprises a brake module 11c having an idle belt 4—i.e. a belt stretched between two pulleys 15, 16 fitted to a structure 14, and having a spacer 20 but no motor 21—and located at the downstream (finish) end of work line 25 opposite the upstream end.

Conveyor system 1 also comprises a decelerating station defined by at least one module 11d having a powered belt 4 with a special motor 21 for rapidly varying the traveling speed of belt 4 under the command of a central control unit 30 defined, for example, by a PLC. Module 11d is located immediately upstream from push module 11b, and, in addition to special motor 21, also comprises, a control substation 31 of central control unit 30, for directly controlling the speed of motor 21 of module 11d; first sensors 32 for determining the linear speed of belts 4 of push module 11b and module 11d defining the decelerating station; and second sensors 33 for determining the presence/absence of a truck 5 along an end portion of the pair of rails 2, 3 of module 11d adjacent to push module 11b.

By means of a special program, central control unit 30, together with substation 31, therefore provides for gradually varying the linear speed of powered belt 4 of module 11d between the speed of powered belt 4 of the adjacent upstream standard module 11 and the speed of belt 4 of push module 11b, within the time interval in which one pad (8) of a truck 5 leaves belt 4 of the module 11 immediately upstream from the decelerating station, and another pad (9) of the same truck 5 engages belt 4 of push module 11b (FIG. 1).

Similarly, conveyor system 1 also comprises an accelerating station defined by at least one module 11e having a powered belt 4 and located immediately downstream from brake module 11c. Module 11e is identical with module 11d described above, and comprises a substation 31 of central control unit 30; sensors 32 for determining the linear speed of belt 4 of module 11e and, possibly, of brake module 11c; and sensors 33 for determining the presence/absence of a truck 5 along an end portion of the pair of rails 2, 3 of brake module 11c.

The drive means of module 11e thus provide for gradually varying the linear speed of respective powered belt 4 between the speed of idle belt 4 of brake module 11c and the speed of powered belt 4 of the standard module 11 immediately downstream from the accelerating station, within the time interval in which one pad (8) of a truck 5 leaves the idle belt 4 of brake module 11c, and another pad (9) of the same truck 5 engages powered belt 4 of the module 11 immediately downstream from the accelerating station (module 11e).

In other words, electronic control systems 30, 31, 32, 33 selectively ensure only one truck 5 at a time engages belts 4 of the modules defining the decelerating and accelerating stations.

To enable push module 11b to produce sufficient linear thrust to move the train of trucks 5 formed in use along work line 25, module 11b is equipped with additional push means to springs 10 of trucks 5, for increasing the pressure exerted by pads 8, 9 on the outer face of the branch of each belt 4 facing trucks 5; which additional push means comprise a reduction in the vertical assembly distance d (FIG. 2) between the powered belt 4 and the pair of rails 2, 3 of module 11b, so as to increase precompression of springs 10 of the truck 5 engaging push module 11b.

To reduce the wear of belt 4, particularly in the case of very long lines 25 or trucks 5 of considerable weight or carrying very heavy loads, push module 11b may comprise, in addition to powered belt 4, a second belt 40 (FIGS. 2, 4 and 5), which is stretched between two idle pulleys 41, has smooth faces, and the branch of which facing trucks 5 is interposed between the inner face of the corresponding branch of powered belt 4 of push module 11b, and spacer 20 of antifriction material.

Conveyor system 1 according to the invention thus provides for moving a train, comprising a large number of trucks 5, along work line 25 at rigorously controlled, constant speed, and much more accurately and reliably than conventional conveyor systems. At the same time, only two modules (11d and 11e) of system 1 require more sophisticated motors 21, which are anyway controlled by a low-cost electronic control system, thus greatly reducing the cost of the system as a whole.

Distance d is varied by moving rails 2, 3 of push module 11b slightly closer vertically to belt 4 by means of a support 14 fitted closer to the transverse space between rails 2, 3 in which pads 8, 9 of trucks 5 run. Though, obviously, other on-truck methods acting on springs 10 may be used.

The invention claimed is:

1. An integrated conveyor system comprising a number of trucks, and a number of independent modules, each comprising a pair of rails, and a powered belt stretched inside the transverse space defined between the pair of rails; the modules being arranged with the pairs of rails end to end to form a substantially continuous support and guide structure for said trucks, which run along said pairs of rails, and each have at least one pair of grip pads, which, with the aid of push means, selectively engage, and are moved along the rails in a predetermined direction by, the powered belts of said modules; the pads of each truck being located such a distance apart that, when a truck leaves a first module to engage a second module adjacent to the first, at least one pad of the truck still cooperates with the belt of at least one of said first and second modules; characterized by also comprising:

a number of modules having no powered belt, and aligned to define a work line; and a push module having a powered belt and located at a first end of the work line;

each of said number of trucks having stop means for forming, along said work line and downstream from the push module, a train of trucks contacting one another between said rails; the train of trucks being pushed along at a predetermined speed by the powered belt of the push module only.

2. An integrated conveyor system as claimed in claim 1, characterized by also comprising a brake module having a nonpowered idle belt, and located at a second end of the work line opposite the first end.

3. An integrated conveyor system as claimed in claim 1, characterized in that said powered belts and said idle belt are each stretched, to form an endless loop comprising two straight branches, between two rotary pulleys carried integrally by each module.

4. An integrated conveyor system as claimed in claim 2, characterized by also comprising a decelerating station defined by at least one said module having a powered belt and located immediately upstream from the push module; drive means of said at least one module defining the decelerating station gradually varying the linear speed of the respective powered belt between the speed of the powered belt of the immediately upstream module and the speed of the belt of the push module, within the time interval in which one pad of a truck leaves the belt of said module immediately upstream from the decelerating station, and another pad of the same truck engages the belt of said push module.

5. An integrated conveyor system as claimed in claim 2, characterized by also comprising an accelerating station defined by at least one said module having a powered belt and located immediately downstream from said brake module; drive means of said at least one module defining the accelerating station gradually varying the linear speed of the respective powered belt between the speed of the idle belt of the brake module and the speed of the powered belt of the module immediately downstream from the accelerating station, within the time interval in which one pad of a truck leaves the idle belt of said brake module, and another pad of the same truck engages the powered belt of the module immediately downstream from the accelerating station.

6. An integrated conveyor system as claimed in claim 4, characterized in that said decelerating station has electronic control means comprising first sensors for determining the linear speed of the belts of the push module and of the at least one module defining the decelerating station; and second sensors for determining the presence/absence of a truck along an end portion of the pair of rails of the at least one module defining the decelerating station and adjacent to the push module.

7. An integrated conveyor system as claimed in claim 5, characterized in that said accelerating station has electronic control means comprising first sensors for determining the linear speed of the belts of the brake module and of the at least one module defining the accelerating station; and second sensors for determining the presence/absence of a truck along an end portion of the pair of rails of the brake module.

8. An integrated conveyor system as claimed in claim 6, characterized in that said electronic control means selectively ensure only one truck at a time engages the belt of the at least one module defining said deceleration station and said accelerating station.

9. An integrated conveyor system as claimed in claim 2, characterized in that, between respective inner faces of respective branches of each of said powered belts and of said idle belt, there is located a spacer made of antifriction material, and along which slides the inner face of the belt branch facing said trucks.

10. An integrated conveyor system as claimed in claim 9, characterized in that said powered belts and said idle belt are double-toothed belts; said pads being toothed pads engaging an outer face of a branch of each belt facing said trucks.

11. An integrated conveyor system as claimed in claim 10, characterized in that said push module comprises, in addition to said powered belt, a second belt, which is stretched between a pair of idle pulleys, has smooth faces, and a branch of which facing said trucks is interposed between the inner face of the corresponding branch of the powered belt of the push module and said spacer of antifriction material.

12. An integrated conveyor system as claimed in claim 11, characterized in that said push means comprise, for each pad, elastic means for pressing the pad against an outer face of the branch of each belt facing said trucks; and, for said push module, a reduction in the assembly distance between said powered belt and said pair of rails, so as to increase the compression of said elastic means of the truck engaging the push module, and so increase the thrust that can be applied to the truck by said powered belt.

13. An integrated conveyor system as claimed in claim 1, characterized in that said trucks each have a number of wheels or rollers idly engaging said pairs of rails to guide said trucks both transversely and vertically.

14. An integrated conveyor system comprising a number of trucks, and a number of independent modules, each comprising a pair of rails, and a powered belt stretched inside the transverse space defined between the pair of rails; the modules being arranged with the pairs of rails end to end to form a substantially continuous support and guide structure for said trucks, which run along said pairs of rails, and each have at least one pair of grip pads, which, with the aid of push means, selectively engage, and are moved along the rails in a predetermined direction by, the powered belts of said modules; the pads of each truck being located such a distance apart that, when one of the trucks leaves a first module to engage a second module adjacent to the first, at least one pad of said one of the trucks still cooperates with the belt of at least one of said first and second modules; characterized by also comprising:
   a number of modules having no powered belt, and aligned to define a work line;
   a push module having a powered belt and located at a first end of the work line;
   the trucks having stop means for forming, along said work line and downstream from the push module, a train of trucks contacting one another between said rails; the train of trucks being pushed along at a predetermined speed by the powered belt of the push module only; and
   a decelerating station defined by at least one of said modules having a powered belt and located immediately upstream from the push module; drive means of said at least one of said modules defining the decelerating station gradually varying the linear speed of the respective powered belt between the speed of the powered belt of the immediately upstream module and the speed of the belt of the push module, within the time interval in which one pad of one of the trucks leaves the belt of said module immediately upstream from the decelerating station, and another pad of the same truck engages the belt of said push module.

15. An integrated conveyor system comprising a number of trucks, and a number of independent modules, each comprising a pair of rails, and a powered belt stretched inside the transverse space defined between the pair of rails; the modules being arranged with the pairs of rails end to end to form a substantially continuous support and guide structure for said trucks, which run along said pairs of rails, and each have at least one pair of grip pads, which, with the aid of push means, selectively engage, and are moved along the rails in a predetermined direction by, the powered belts of said modules; the pads of each truck being located such a distance apart that, when one of the trucks leaves a first module to engage a second module adjacent to the first, at least one pad of said one of the trucks still cooperates with the belt of at least one of said first and second modules; characterized by also comprising:
   a number of modules having no powered belt, and aligned to define a work line;
   a push module having a powered belt and located at a first end of the work line;
   a brake module having a nonpowered idle belt and located at a second end of the work line opposite the first end; and
   the trucks having stop means for forming, along said work line and downstream from the push module, a train of trucks contacting one another between said rails; the train of trucks being pushed along at a predetermined speed by the powered belt of the push module only.

16. An integrated conveyor system comprising a number of trucks, and a number of independent modules, each comprising a pair of rails, and a powered belt stretched inside the transverse space defined between the pair of rails; the modules being arranged with the pairs of rails end to end to form a substantially continuous support and guide structure for said trucks, which run along said pairs of rails, and each have at least one pair of grip pads, which, with the aid of push means, selectively engage, and are moved along the rails in a predetermined direction by, the powered belts of said modules; the pads of each truck being located such a distance apart that, when a truck leaves a first module to engage a second module adjacent to the first, at least one pad of the truck still cooperates with the belt of at least one of said first and second modules; characterized by also comprising:
   a number of modules having no powered belt, and aligned to define a work line;
   a push module having a powered belt and located at a first end of the work line;
   the trucks having stop means for forming, along said work line and downstream from the push module, a train of trucks contacting one another between said rails; the train of trucks being pushed along at a predetermined speed by the powered belt of the push module only;
   a brake module having a nonpowered idle belt, and located at a second end of the work line opposite the first end; and
   an accelerating station defined by at least one said module having a powered belt and located immediately downstream from said brake module; drive means of said at least one module defining the accelerating station gradually varying the linear speed of the respective powered belt between the speed of the idle belt of the brake module and the speed of the powered belt of the module immediately downstream from the accelerating station, within the time interval in which one pad of a truck leaves the idle belt of said brake module, and another pad of the same truck engages the powered belt of the module immediately downstream from the accelerating station.

17. An integrated conveyor system comprising a number of trucks, and a number of independent modules, each comprising a pair of rails, and a powered belt stretched inside the transverse space defined between the pair of rails; the modules being arranged with the pairs of rails end to end to form a substantially continuous support and guide structure for said trucks, which run along said pairs of rails, and each have at least one pair of grip pads, which, with the aid of push means, selectively engage, and are moved along the rails in a predetermined direction by, the powered belts of said modules; the pads of each truck being located such a distance apart that, when a truck leaves a first module to engage a second module adjacent to the first, at least one pad of the truck still cooperates with the belt of at least one of said first and second modules; characterized by also comprising:

a number of modules having no powered belt, and aligned to define a work line; and a push module having a powered belt and located at a first end of the work line;

the trucks having stop means for forming, along said work line and downstream from the push module, a train of trucks contacting one another between said rails; the train of trucks being pushed along at a predetermined speed by the powered belt of the push module only;

a brake module having a nonpowered idle belt, and located at a second end of the work line opposite the first end; and wherein said powered belts and said idle belt are double-toothed belts, said pads being toothed pads engaging an outer face of a branch of each belt facing said trucks.

* * * * *